INVENTOR
MARCEL MABRU
BY Emmett F. Salter
ATTORNEY

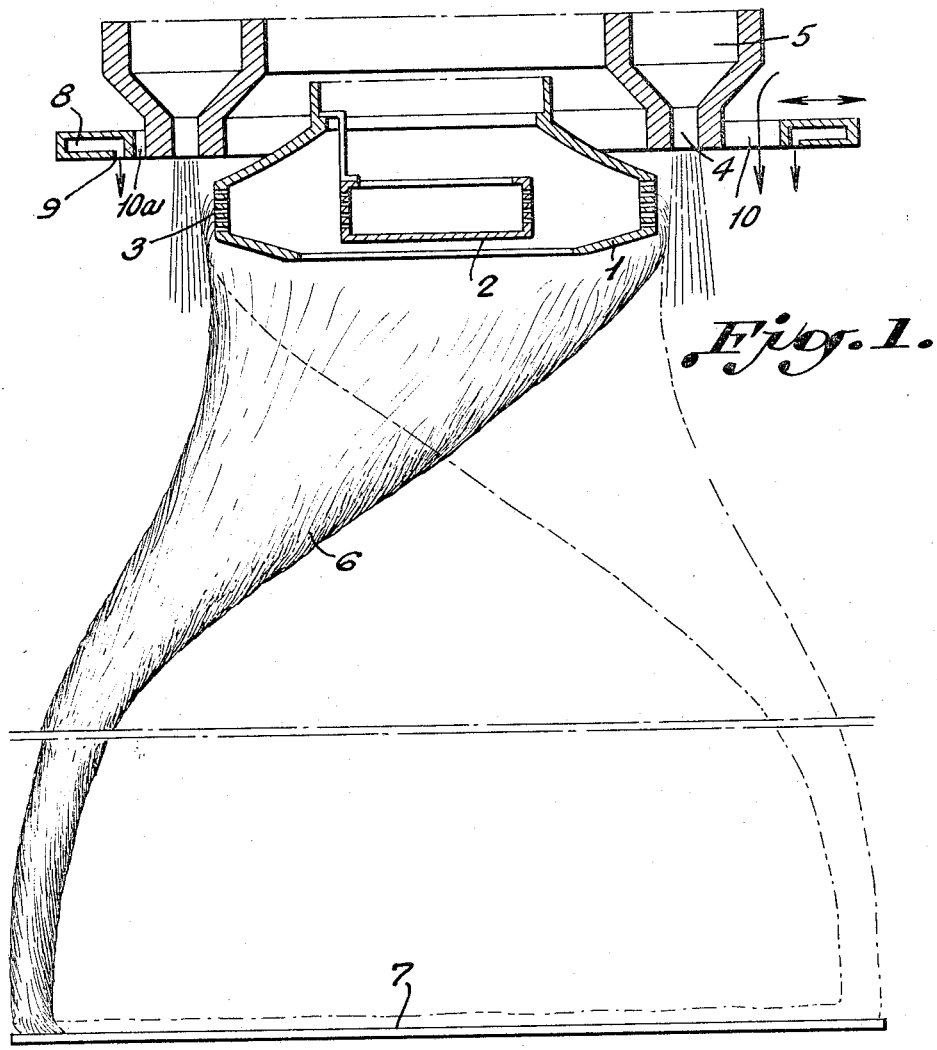
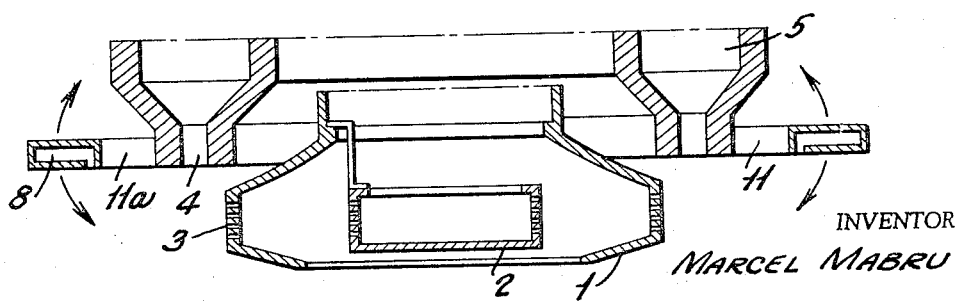

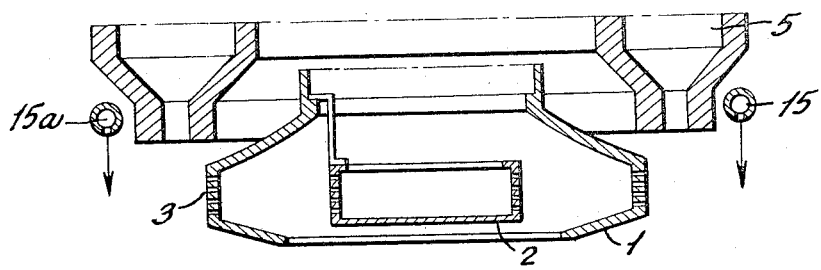
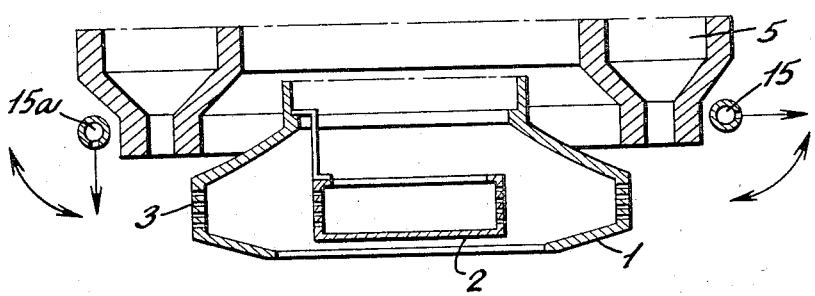
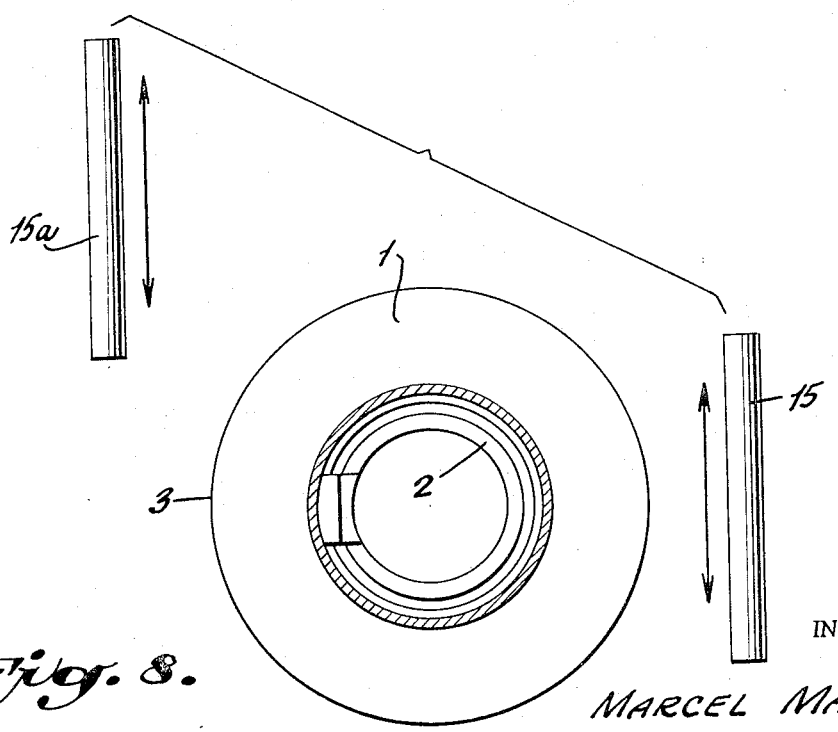

Jan. 3, 1967          M. MABRU          3,295,943

PROCESS AND APPARATUS FOR THE MANUFACTURE OF FIBER MATS

Filed Feb. 28, 1963          4 Sheets-Sheet 4

INVENTOR
MARCEL MABRU

BY Emmett F. Salter

ATTORNEY

United States Patent Office 3,295,943
Patented Jan. 3, 1967

3,295,943
PROCESS AND APPARATUS FOR THE MANUFACTURE OF FIBER MATS
Marcel Mabru, Paris, France, assignor to Compagnie De Saint-Gobain, Neuilly-sur-Seine, France, a corporation of France
Filed Feb. 28, 1963, Ser. No. 261,899
Claims priority, application France, Mar. 5, 1962, 889,975
14 Claims. (Cl. 65—6)

The present invention relates to the manufacture of mats made of fibers of thermoplastic materials and more especially of organic thermoplastic fibers. It relates more particularly to the manufacture of such mats obtained from fibers produced by centrifugation and especially of fibers produced by bringing the material to the viscous state inside a hollow body whose periphery is provided with orifices and which is rotated at high speed around its axis.

These fibers are carried under the centrifuging body as a tubular fleece or curtain and gathered on a collecting organ, such as a conveyor belt.

It has already been suggested, particularly in the manufacture of mats of mineral fibers and quite especially of glass fibers, to bring one or several gaseous currents to act on the tubular fleece of fibers under the generating organ and above the collecting organs, said gaseous currents being directed against said fleece so as to distort it and spread the fibers so scattered in a volume whose contact surface with the collecting organ covers substantially the whole width of the latter, said volume eventually tending to be reduced to a substantially flat fleece.

This process is particularly efficient for the spreading of short fibers into an homogeneous mat and quite especially interesting for the manufacture of glass fiber mats.

It is also known to place between the generating organ and the collecting one, and beneath the former, blowing organs fed intermittently, imparting an alternating motion to the fleece and consequently sweeping the collecting organ.

These processes however cannot be used, without causing serious trouble, to spread long fibers on a collector and particularly fibers having a certain amount of curl, therefore apt to hook together, as this is the case for organic fibers. In fact, because of their tendency to curl and hook together the fibers build up a sort of sliver difficult to loosen and the mat obtained lacks uniformity as regards density and thickness.

One object of the present invention is to provide a method permitting to obtain an homogeneous mat of fibers even if said fibers are long and obtained from organic substances. This method consists in modifying unsymmetrically and variably the degree of pressure existing in an annular zone surrounding the centrifuging organ out of which filaments of molten material are projected.

Under such conditions, the formation of slivers is eliminated and the fleece of fibers is swung from one edge of the collector to the other, which results in a homogeneous mat of uniform thickness.

According to another characteristic of the present invention, an overpressure is generated in a part of the annular zone surrounding the centrifuging body, as compared to the pressure in the rest of said annular zone, and, conversely, an overpressure in the part opposite the first, such an alternation being repeated regularly to produce the sweeping of the conveyor by the tubular fleece of fibers.

An object of the present invention is to protect a part of said annular zone against air induction, whilst such an air induction is generated in the opposite part of said zone, and to insure a cyclical or periodical alternation of these different zones so as to swing the tubular fleece of fibers from one edge of the collector to the other.

Another object of the present invention is to direct gaseous currents towards the annular zone surrounding the centrifuging organ, said gaseous currents having also an alternating motion, in order to directly act on the orientation of the fibers escaping from the centrifuging organ and to produce the swing of the fleece over the collector.

In a first embodiment of the invention air is induced periodically in a part of the annular zone surrounding the centrifuging organ by means of a blower ring, whereby the air is induced between said ring and the peripheral band of the said centrifuging organ.

The invention mainly provides for the use of a blower ring entirely surrounding the centrifuging organ and periodically moved with regard to it, although remaining at the same level. Under these conditions, the zones in which induction takes place change periodically, a zone where maximum induction occurs being opposite to that where there is practically no induction.

In another embodiment, baffles are moved periodically or cyclically so as either to permit free access of air to a part of the annular zone surrounding the centrifuging body or to conversely oppose such access of air. These baffles may have a rotating motion bringing them successively in horizontal or inclined position and in vertical position. They may also have a translating or reciprocating motion.

According to a mode of operation of the invention the centrifuging organ is surrounded with a swinging blower ring, said swing resulting in that the gaseous currents direct the fleece of fibers alternately from one edge of the collector to the other.

Another mode of operation provides for blower rails located on both sides of the centrifuging organ and moved to and fro in opposite timing with the provision that said rails may be fed alternately with fluid under pressure.

Further objects and advantages of the present invention will further appear from the following description when it is read in connection with the annexed drawings wherein the same numbers refer to the same elements. It is however apparent that, within the scope of the invention, modifications and arrangements different from those herein disclosed can be made, the invention comprehending all variations thereof.

In the drawings:

FIG. 1 is a sectional view of one embodiment of the invention for forming the annular curtain of fibers and depositing the same across substantially the entire width of a traveling conveyor therebelow;

FIG. 2 is a sectional view of a modified form of the invention shown in FIG. 1, featuring an arrangement for rocking the outer blower ring;

FIG. 6 is a sectional view of another embodiment of the invention which incorporates blower rails beyond the centrifuge above the sides of the traveling conveyor adapted to be disposed therebelow;

FIG. 7 is a sectional view corresponding to FIG. 6, and which illustrates the blower rails adapted to be rocked alternately, when fluid is fed thereto continuously, to effect the alternate induction of air into the zone below the centrifuge from opposite lateral directions;

FIG. 8 is a plan view of FIG. 6 illustrating the alternate reciprocation of the blower rails relative to centrifuge, when fluid is fed to the rails continuously;

Figure 3:
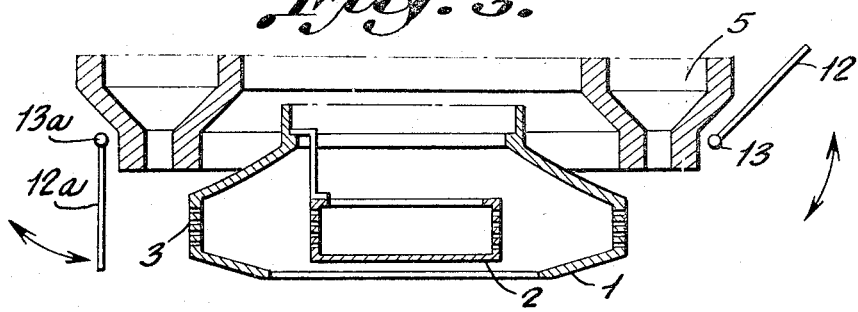
FIG. 3 is a sectional view of a third embodiment of the invention featuring plane baffles adapted to swing alternately between positions adjacent to the pheripheral wall of the centrifuge to positions thereabove.

The various figures of these drawings show a centrifuging body 1 into which the material is fed in the viscous state, and a basket 2 with perforated side wall effecting the distribution of said material over the whole height of the peripheral band 3 of the centrifuging organ. The filaments of material thrown off the orifices of peripheral band 3 can in some cases be subjected to the action of gaseous jets issuing from the orifices or from the slot 4 of an annular ring 5 coaxial with the rotating body, such action resulting in the drawing of the filaments into fine fibers building up a tubular fleece or curtain 6 below the centrifuging body. The nature, the temperature and the speed of the gaseous currents are determined by the nature of the material forming the fibers and the characteristics these fibers present. In some cases these currents can be completely omitted, the fibers being drawn under the action of only the centrifuging force.

The fleece is then collected on an organ such as the conveyor 7 to build up a mat on it. In all the figures the conveyor 7 is supposed to move in a plane perpendicular to the plane of said figures.

In the embodiment illustrated by FIG. 1, the apparatus comprises a blower ring 8 through whose orifices or slot 9 escape gaseous jets substantially parallel to the axis of the centrifuging body. This ring surrounds the rotating body and is located at a higher level than the zone where the filaments of material are projected.

The blower ring 8 is moved to and fro in a direction perpendicular to the axis of the centrifuging body. In the position shown in FIG. 1, where ring 8 is shifted rightward, induced air may obviously pass into part 10 located between said ring and ring 5, whereas practically no induced air at all may pass into diametrally opposite part 10a. The result is that, in this position, the fleece of fibers is distorted and shifted leftwards and nears the left edge of conveyor 7.

When ring 8 is in the reverse or alternative position, the effect obtained is reverse, i.e., air is induced in 10a whilst practically cut off in 10. The fleece of fibers then reaches the right edge of the conveyor. A swinging movement of the fleece of fibers is thus obtained from one edge of the conveyor to the other and therefore a regular setting of fibers over the whole width of said conveyor and thence a homogeneous mat.

In the particular embodiment illustrated by FIG. 2 the blower ring is identical to that of FIG. 1 but has a swinging motion resulting in a variation of the sections of passages 11 and 11a and therefore of the air alternately induced on either side of the centrifuging organ.

The apparatus illustrated by FIG. 3 comprises plane baffles 12–12a able to oscillate around axes 13–13a located in a plane above the projection zone of filaments of material. Each of these baffles is oscillated around these axes, the oscillations being equal in amplitude but phase-shifted so that, when a baffle is vertical (position resulting in a minimum air-induction), the other baffle is horizontal or lifted (position of maximum air-induction).

Figure 4:
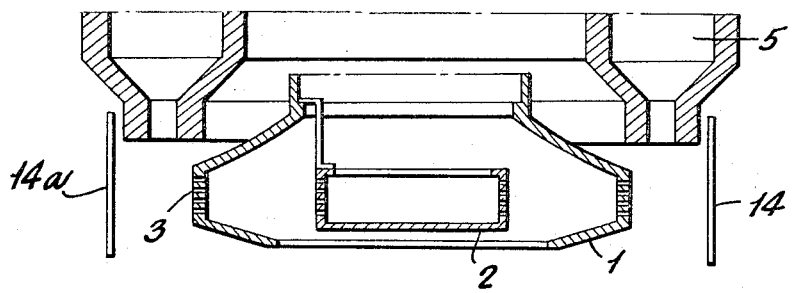
FIG. 4 is a sectional view of a fourth embodiment of the invention featuring plane baffles adapted to be reciprocated alternately between positions adjacent to the peripheral wall of the centrifuge to positions therebeyond.
Figure 5:
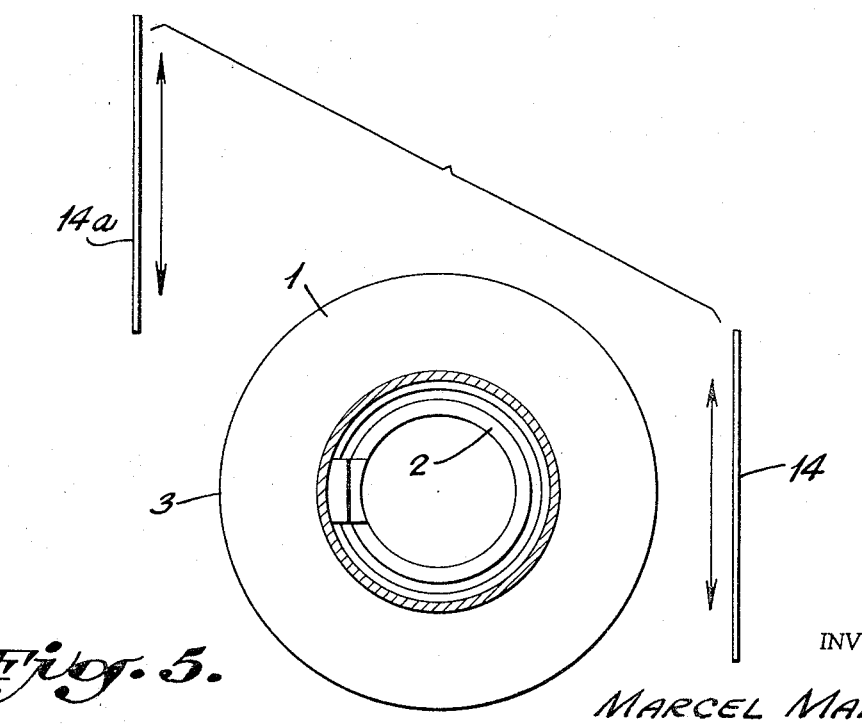
FIG. 5 is a plan view of the arrangement shown in FIG. 4.

In the embodiment shown in FIGS. 4 and 5 the baffles 14 and 14a in vertical position, are moved to and fro along a direction parallel to the feeding motion of the conveyor. FIG. 6 shows another apparatus comprising two blower rails 15 and 15a located above the zone of projection of filaments outside the orifices of the peripheral band of the centrifuging body. These rails are located parallel to the longitudinal axis of the conveyor, They may be fed with fluid under pressure either alternately or continuously. In the latter case they may be oscillated around their axis (FIG. 7) like the baffles 13–13a of FIG. 3, or moved to and fro (FIG. 8) like the deflectors 14–14a of FIG. 5.

Blower rails and baffles may also be associated. The blower rails may be semi-circular and associated with semi-circular baffles.

Figure 9:
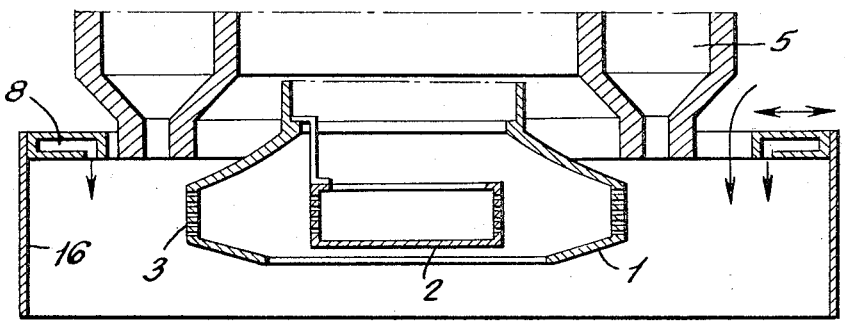
FIG. 9 is a sectional view of another embodiment of the invention which combines arcuate baffle means with a blower ring of the type shown in FIG. 1.

FIG. 9 shows an arrangement associating to a blower ring, such as ring 8 of the arrangement shown in FIG. 1 moved to and fro perpendicularly to the axis of the centrifuging body, a cylindrical screen 16 secured outside said blower ring. The action of screen 16 supplements that of ring 8 on the currents of induced air. This screen may be continuous or made of two cylinder fractions.

Such screens may be associated with blower rails such as rails 15–15a of the above-described arrangements.

Figure 10:
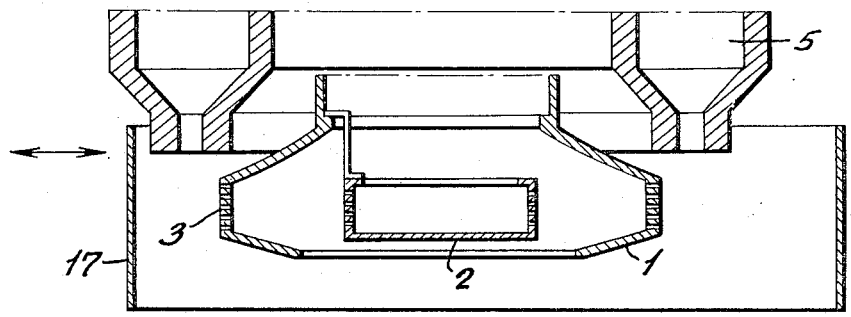
FIG. 10 is a sectional view similar to FIG. 9 featuring a shiftable cylindrical baffle screen, to the exclusion of a blower ring.

In the arrangements shown in FIG. 10 the apparatus according to the invention includes no blower ring to act on the induction of air. This action is obtained by means of a cylindrical screen 17 moved to and fro perpendicularly to the axis of the centrifuging body and driving, by this motion, the currents of induction so as to swing the fiber fleece from one edge of the conveyor to the other.

What is claimed is:

1. The method of producing continuous lengths of mats of thermoplastic fibers which comprises the steps of centrifugally extruding the fibers in the form of a continuous annular curtain from a rotary centrifuge, and gently depositing said annular curtain of fibers onto a traveling conveyor below the centrifuge by inducing air from above the centrifuge at one side of the conveyor into a zone between the centrifuge and conveyor, and cyclically gradually alternating the induction of said air from the opposite sides of the centrifuge overlying the sides of the conveyor to flatten the annular curtain from opposite directions as the same is brought to rest on the conveyor.

2. Apparatus for producing a continuous mat of thermoplastic fibers comprising a vertically disposed rotary centrifuge having a peripheral wall provided with orifices for the centrifugal extrusion of fine fibers therefrom, a traveling conveyor below said centrifuge for receiving the annular curtain of fibers which are projected from said centrifuge, and means for flattening said annular curtain in its travel from said centrifuge to said conveyor comprising means at least at the level of said peripheral wall for inducing air from a zone above said peripheral wall to a zone therebelow cyclically and alternately from the opposite sides of the centrifuge overlying the sides of said conveyor to flatten the annular curtain as it drops from said centrifuge onto said traveling conveyor.

3. Apparatus for producing a continuous mat of thermoplastic fibers comprising a vertically disposed rotary centrifuge having a peripheral wall provided with orifices for the centrifugal extrusion of fine fibers therefrom, a traveling conveyor below said centrifuge for receiving the annular curtain of fibers which are projected from said centrifuge, and means for flattening said annular curtain in its travel from said centrifuge to said conveyor comprising annular blowing means surrounding said centrifuge above said peripheral wall provided with blowing nozzles on the opposite sides of said centrifuge overlying the sides of said conveyor, and means for cyclically and alternately shifting laterally said last-mentioned blowing nozzles relatively to the sides of said centrifuge for inducing air from above the centrifuge in varying degrees to the opposite sides of the curtain of fibers in the zone below said centrifuge, thereby to flatten the annular curtain from opposite directions as it drops from said centrifuge onto said traveling conveyor.

4. Apparatus for producing a continuous mat of thermoplastic fibers comprising a vertically disposed rotary centrifuge having a peripheral wall provided with orifices for the centrifugal extrusion of fine fibers therefrom, a fixed annular blower surrounding said centrifuge coaxially therewith and having blowing slots above and beyond said peripheral wall for directing said fibers downwardly and attenuating them to form a downwardly falling annular curtain of fine fibers, a travelling conveyor below said centrifuge for receiving said curtain of fibers, a movable annular crown of blowers surrounding said centrifuge and said fixed annular blower also disposed above said peripheral wall and provided with blowing nozzles on the opposite sides of said centrifuge overlying the sides of said conveyor, and means for cyclically and alternately shifting laterally said last-mentioned blowing nozzles relatively to the sides of said centrifuge for inducing air from above the centrifuge in varying degrees to the opposite sides of the curtain of fibers in the zone below said centrifuge, thereby to flatten the annular curtain from opposite directions as it drops from said centrifuge onto said traveling conveyor.

5. An apparatus as set forth in claim 4, including a cylindrical screen extending downwardly from said movable annular crown of blowers and movable therewith.

6. Apparatus for producing a continuous mat of thermoplastic fibers comprising a vertically disposed rotary centrifuge having a peripheral wall provided with orifices for the centrifugal extrusion of fine fibers therefrom, a traveling conveyor below said centrifuge for receiving the annular curtain of fibers which are projected from said centrifuge, and means for flattening said annular curtain in its travel from said centrifuge to said conveyor comprising two horizontal blowing rails having blowing nozzles on the opposite sides of said centrifuge above the peripheral wall thereof and overlying the sides of said conveyor, and means for cyclically and alternately controlling the discharge of gases from said nozzles relatively to the opposite sides of said centrifuge for inducing air from above the centrifuge in varying degrees to the opposite sides of the curtain of fibers in the zone below said centrifuge, thereby to flatten the annular curtain from opposite directions as it drops from said centrifuge onto said traveling conveyor.

7. An apparatus as set forth in claim 6 wherein said blower rails are fixed and the supply of gases to said rails for discharge from said nozzles is gradually varied cyclically and alternately.

8. An apparatus as set forth in claim 6 including a source of gas connected to the blowing rails continuously, and means for shifting the blowing nozzles cyclically and alternately relatively to the sides of said centrifuge.

9. Apparatus for producing a continuous mat of thermoplastic fibers comprising a vertically disposed rotary centrifuge having a peripheral wall provided with orifices for the centrifugal extrusion of fine fibers therefrom, a fixed annular blower surrounding said centrifuge coaxially therewith and having glowing slots above and beyond said peripheral wall for directing said fibers downwardly and attenuating them to form a downwardly falling annular curtain of fine fibers, a traveling conveyor below said centrifuge for receiving said curtain of fibers, two horizontal blowing rails having blowing nozzles on the opposite sides of said centrifuge beyond and adjacent to said annular blower and overlying the sides of said conveyor, and means for cyclically and alternately controlling the discharge of gases from said nozzles relatively to the opposite sides of said centrifuge for inducing air from above the centrifuge in varying degrees to the opposite sides of the curtain of fibers in the zone below said centrifuge, thereby to flatten the annular curtain from opposite directions as it drops from said centrifuge onto said traveling conveyor.

10. Apparatus for producing a continuous mat of thermoplastic fibers comprising a vertically disposed rotary centrifuge having a peripheral wall provided with orifices for the centrifugal extrusion of fine fibers therefrom, a fixed annular blower surrounding said centrifuge coaxially therewith and having blowing slots above and beyond said peripheral wall for directing said fibers downwardly and attenuating them to form a downwardly falling annular curtain of fine fibers, a traveling conveyor below said centrifuge for receiving said curtain of fibers, two plane baffle plates on the opposite sides of said centrifuge beyond and adjacent to said annular blower and overlying the sides of said conveyor, said plates adapted to be disposed alternately at approximately the level of said peripheral wall, and means for cyclically and alternately shifting said baffle plates relatively to the sides of said centrifuge for inducing air from above the centrifuge in varying degrees to the opposite sides of the curtain of fibers in the zone below said centrifuge, thereby to flatten the annular curtain from opposite directions as it drops from said centrifuge onto said traveling conveyor.

11. An apparatus as set forth in claim 10 wherein said shifting means for said baffle plate comprises means for oscillating said plates in opposite directions around horizontal axes located in a plane above the peripheral wall of said centrifuge and perpendicular to the rotary axis thereof.

12. An apparatus as set forth in claim 10 wherein said shifting means for said baffle plates comprises means for reciprocating said baffle plates horizontally to-and-fro to bring the plates alternately adjacent to the opposite sides of said centrifuge.

13. Apparatus for producing a continuous mat of thermoplastic fibers comprising a vertically disposed rotary centrifuge having a peripheral wall provided with orifices for the centrifugal extrusion of fine fibers therefrom, a fixed annular blower surrounding said centrifuge coaxially therewith and having blowing slots above and beyond said peripheral wall for directing said fibers downwardly and attenuating them to form a downwardly falling annular curtain of fine fibers, a traveling conveyor below said centrifuge for receiving said curtain of fibers, symmetrical arcuate baffle means extending on the opposite sides of said centrifuge overlying the sides of said conveyor beyond said annular blower and downwardly from above the outlets of said blowing slots to below the bottom of said centrifuge, and means for cyclically and alternately shifting said arcuate baffle means relative to the opposite sides of said centrifuge in a lateral direction transversely of the longitudinal axis of said traveling conveyor for inducing air from above the centrifuge in varying degrees to the opposite sides of the curtain of fibers in the zone below said centrifuge, thereby to flatten the annular curtain from opposite directions as it drops from said centrifuge onto said traveling conveyor.

14. An apparatus as set forth in claim 13 wherein said arcuate baffle means consists of a cylindrical screen.

References Cited by the Examiner
UNITED STATES PATENTS

| | | |
|---|---|---|
| 2,338,570 | 1/1944 | Childs. |
| 2,571,457 | 10/1951 | Ladisch. |
| 2,618,013 | 11/1952 | Weigand et al. _____ 18—2.5 |
| 2,626,425 | 1/1953 | Hawthorne et al. _____ 18—2.5 |
| 3,020,585 | 2/1962 | Bethon et al. _____ 65—9 X |
| 3,030,659 | 4/1962 | Slayter _____ 65—9 X |

DONALL H. SYLVESTER, *Primary Examiner.*

MAURICE LIEBMAN, *Examiner.*

C. B. HAMBURG, R. L. LINDSAY, *Assistant Examiners.*